United States Patent [19]
Heissenberger

[11] Patent Number: 6,165,370
[45] Date of Patent: Dec. 26, 2000

[54] PRESSURE SCREEN MONITORING APPARATUS AND METHOD

[75] Inventor: Walter J. Heissenberger, Wrentham, Mass.

[73] Assignee: Voith Sulzer Paper Technology North America, Inc., Mansfield, Mass.

[21] Appl. No.: 09/010,087

[22] Filed: Jan. 21, 1998

[51] Int. Cl.[7] .................................. C02F 1/00; C02F 1/26
[52] U.S. Cl. .............................. 210/741; 210/90; 210/97; 210/143; 210/499
[58] Field of Search ................................. 210/90, 106, 97, 210/109, 137, 143, 409, 741, 499

[56] References Cited

U.S. PATENT DOCUMENTS

| | | |
|---|---|---|
| 4,042,503 | 8/1977 | Justus . |
| 4,198,860 | 4/1980 | King . |
| 4,264,437 | 4/1981 | Hayes, Jr. . |
| 4,427,552 | 1/1984 | Lieberherr et al. . |
| 4,479,872 | 10/1984 | Wikdahl . |
| 4,789,468 | 12/1988 | Sirkar . |
| 4,846,971 | 7/1989 | Lamort . |
| 5,375,620 | 12/1994 | Ginder, Jr. . |
| 5,513,757 | 5/1996 | Papetti . |

*Primary Examiner*—Matthew O. Savage
*Assistant Examiner*—Michael Fleming
*Attorney, Agent, or Firm*—Samuels, Gauthier & Stevens, LLP.

[57] ABSTRACT

A screening system includes a pressure screen which receives a liquid/solid suspension and filters the suspension to provide an accept portion and a reject portion. The pressure screen includes a housing which encloses a chamber containing a screen basket through which a portion of the liquid/solid suspension passes from a first side of the basket to a second side to form the accepts. A pressure sensor monitors the pressure differential between the first side and the second side and provides a sensed differential pressure signal indicative thereof. The system also senses the accept flow rate and provides a signal indicative thereof to a controller. The controller sets a differential pressure threshold value as a function of the accept flow rate signal and monitors the sensed differential pressure signal. If the sensed differential pressure signal exceeds the threshold value, the controller automatically initiates corrective action in order to reduce the differential pressure across the screen.

18 Claims, 4 Drawing Sheets

PRESSURE SCREEN MONITORING APPARATUS AND METHOD

DESCRIPTION

TECHNICAL FIELD OF THE INVENTION

This invention relates generally to pressure screens used to separate larger particles from liquid/solid suspensions, and is concerned in particular with an improved system and method for monitoring the performance of such devices.

BACKGROUND OF THE INVENTION

Screening systems are widely used in manufacturing processes to separate larger particles from a liquid/solid suspension. For example, applications for screening systems include processing chemical pulp, mechanical groundwood, bleached or unbleached kraft, old corrugated containers, mixed news, drink stock, waste paper or any other type of fiber.

The system typically receives several thousand gallons per minute of liquid/solid suspension, and separates the larger particles using a pressure screen which typically provides an accept flow (smaller particles) and a reject flow (larger particles). An example of a pressure screen is the Model 400 available from Voith Sulzer, the assignee of the present invention.

The system typically includes an automated controller which controls the overall system operation, monitors the system for component failures/flow anomalies, and automatically initiates corrective action. To detect an obstruction across the pressure screen (typically caused by accumulated particles which are too big to pass through the screen), the controller monitors pressure across the screen. If the pressure exceeds a fixed, predetermined differential pressure threshold value, the controller initiates the necessary corrective action in order to remove the blockage. In many prior art systems, the controller simply sounds an alarm when the pressure across the screen exceeds the threshold value, and system operating personnel manually take the necessary corrective action. Significantly, in both automatic and manual systems, initiating corrective action involves interfering with the conventional flow processing, and therefore reduces the processing efficiency of the system.

The predetermined differential pressure threshold value is often selected during the system design of the screening system and remains fixed. Selecting this threshold value has involved a balancing of several factors. If the value is set too low, the controller initiates unnecessary corrective action. In contrast, if the value is set too high, an excessive amount of the liquid/solid suspension will be regularly routed to the reject flow.

A problem with both automatic and manual systems is that the threshold value remains fixed. Specifically, what might be a "high" differential pressure for one accept flow rate or system operating condition, might well be "normal" for another accept flow rate or operating condition.

Therefore, there is a need for an improved system and method for monitoring a pressure screen for flow disturbances.

SUMMARY OF THE INVENTION

An object of the present invention is to provide a system and method for detecting flow disturbances within a pressure screen.

Briefly, according to the present invention, a screening system includes a pressure screen which receives a liquid/solid suspension and filters the suspension to provide an accept portion and a reject portion. The pressure screen includes a housing which encloses a chamber containing a screen basket through which a portion of the liquid/solid suspension passes from a first side of the basket to a second side to form the accepts. A pressure sensor monitors the pressure differential between the first side and the second side and provides a sensed differential pressure signal indicative thereof. The system also senses the accept flow rate and provides a signal indicative thereof to a controller. The controller sets a differential pressure threshold value as a function of the accept flow rate and monitors the sensed differential pressure signal. If the sensed differential pressure signal exceeds the threshold value, the controller generates a high differential pressure condition signal.

Upon detecting that the pressure differential across the screen basket exceeds the adjustable differential pressure threshold value, the controller may automatically initiate corrective action in order to reduce the pressure across the screen. For example, the controller may command the system to reduce the accept flow rate, increase the reject flow rate, or completely shutoff the accept flow. Each of these actions is designed to remove accumulated particles which are blocking flow through the screen basket. However, in some cases the controller may simply trigger an alarm.

Advantageously, by dynamically adjusting (i.e., scheduling) the differential pressure threshold value as a function of accept flow rate, the number of unnecessary corrective actions which the system initiates is reduced. Therefore, the processing cycle of the system has less unnecessary flow interruptions, and hence, provides improved system screening efficiency.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
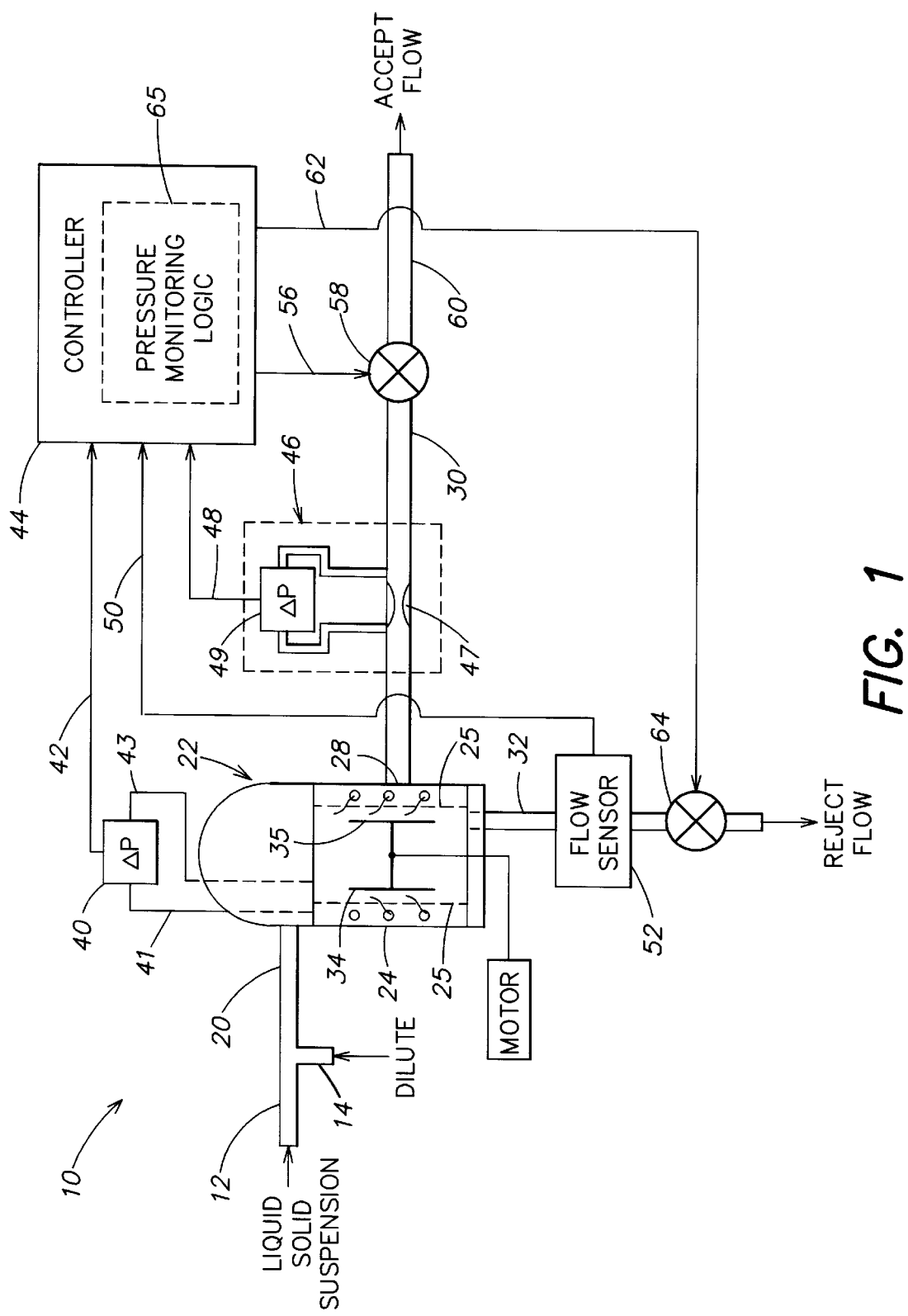
FIG. 1 is a functional illustration of a pressure screening system which includes a pressure screen and a controller.

FIG. 1 illustrates a pressure screening system 10 which receives a liquid/solid suspension through a conduit 12 and a dilute (e.g., water) through a conduit 14. The liquid/solid suspension and the dilute flow are mixed in a conduit 20 which delivers the mixture to a pressure screen 22. As known, the pressure screen 22 includes a housing 24 which forms a cylindrical chamber sized to receive a screen basket, illustrated by broken lines 25. The screen basket 25 includes a cylindrical sidewall having a plurality of slots, holes or other geometric shapes sized to form a barrier that retains particles which are larger than the size of the openings.

Liquid and smaller solids (hereinafter referred to as the "accepts") which pass through the openings in the cylindrical sidewall of the screen basket 25 exit the pressure screen 22 at an outlet 28, and enter a conduit 30. The particles which are too large (hereinafter referred to as the "rejects") to pass through the screen basket 25 migrate through the suspension to the bottom of the basket and exit the pressure screen 22 via conduit 32. The pressure screen includes foils 34, 35 which rotate within the screen basket to remove the particles which are too large to pass through the basket. As the foils rotate they create positive and negative pressure pulses as they pass the openings in the sidewall of the screen basket. One of ordinary skill would appreciate that rather than foils, other pressure pulse generating devices such as bumps, lobes, etc. may be used.

The system 10 also includes a differential pressure sensor 40 (e.g., strain gauge) disposed to monitor the pressure across the screen basket 25 via sense lines 41, 43, and provide a signal indicative thereof on a line 42 to a controller 44. In general, many different types of pressure sensors may be used, including capacitive, differential transformer, force balance or piezoelectric.

The controller 44 preferably includes a microprocessor (not shown) which executes programmable software routines to control the system 10 and monitor the system for any failures. The system 10 also includes a flow rate transducer 46 which measures the flow rate of the accepts in the conduit 30 and provides a signal indicative thereof on a line 48 to the controller 44. Specifically, the transducer 46 includes a venturi sensing element 47 and a differential pressure sensor 49 which senses the pressure drop across the venturi 47. The controller 44 computes the flow through the conduit 30 as function of the square root of the pressure drop across the venturi. The controller also receives a reject flow rate signal on a line 50 from a reject flow sensor 52 (e.g., a magnetic flow sensor) disposed to measure the reject flow in the conduit 32. One of ordinary skill will recognize that many different types of flow meters/sensors can be used including an interference mass flow meter, a thermistor flow meter, a magnetic flow meter, a mass flow meter or a rotameter.

The controller 44 provides an accept flow control signal on a line 56 to an accept flow control proportional valve 58 disposed to receive accept flow from the conduit 30 and provide a variable output accept flow in conduit 60. The controller 44 also provides a reject flow control signal on a line 62 to a reject flow control proportional valve 64 which controls the rejects flow. The valves 58, 64 are proportional valves which allows the controller 44 to modulate the flow area of each valve to control the accept and reject flow.

Figure 2:
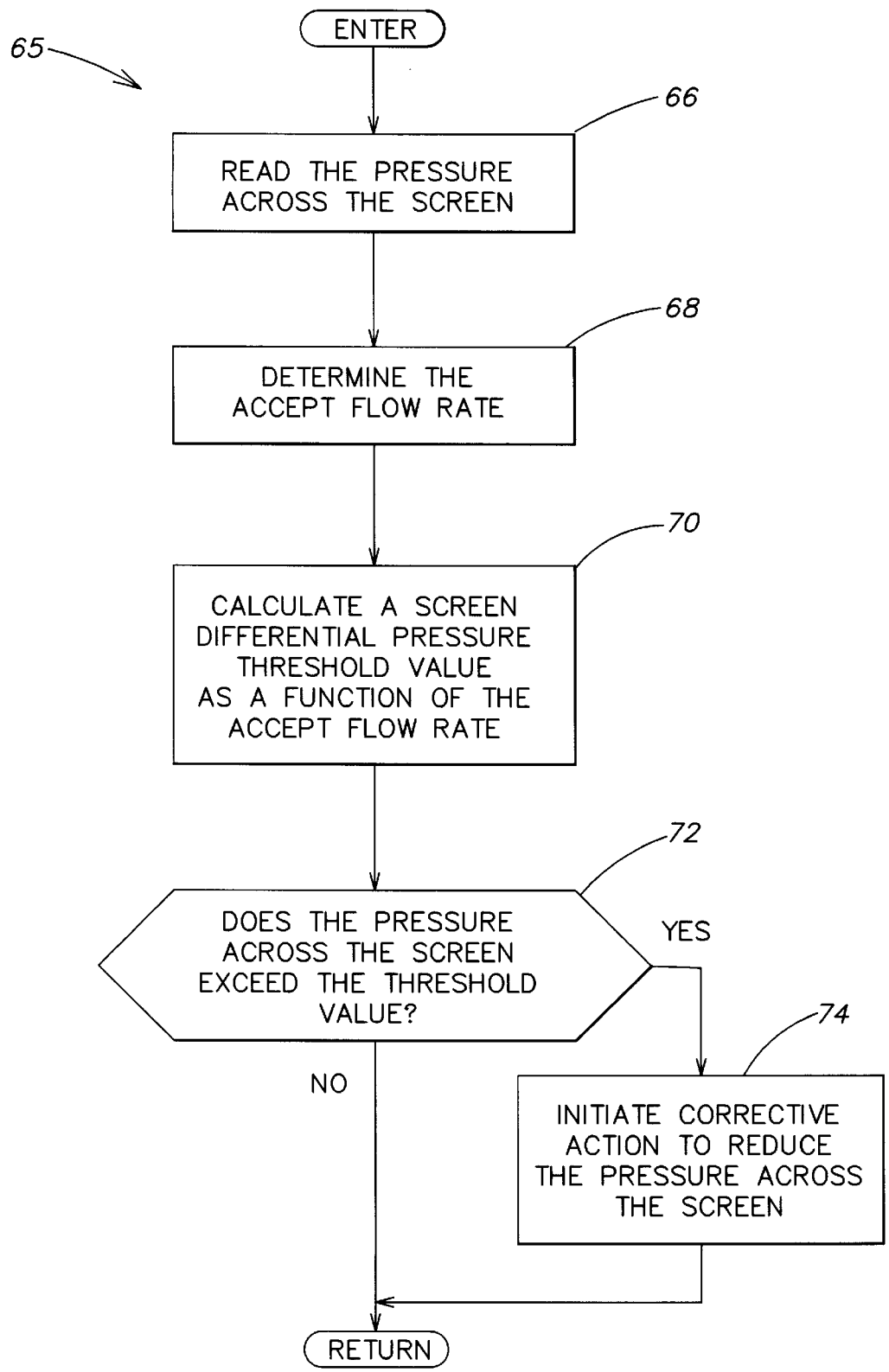
FIG. 2 is a flow chart illustration of pressure monitoring control logic which executes within the controller to monitor pressure across a screen basket within the pressure screen.

According to the present invention, the controller 44 includes pressure monitoring control logic 65. FIG. 2 illustrates a flow chart illustration of the processing steps performed by the monitoring control logic 65. Referring now to FIGS. 1 and 2, upon entering the control logic 65, step 66 is performed to read the signal on the line 42 indicative of the pressure across the screen basket 25. Step 68 is then performed to determine the accept flow rate in the conduit 30. The controller calculates the flow rate by reading the pressure signal on the line 48 and calculating the flow rate as a function of the square root of the pressure drop. Step 70 is then performed to calculate a screen differential pressure threshold value as a function of the accept flow rate. This step can be performed using a look-up table or an equation which characterizes the relationship between the screen differential pressure threshold value and accept flow rate. To insure the system 10 is operating correctly, the controller then performs step 72 to compare the differential pressure signal on the line 42 against the screen differential pressure threshold value to determine if the pressure across the screen basket exceeds the threshold value. If it does, the controller initiates corrective action in step 74 to remove the blockage across the screen basket which reduces the pressure across the screen basket. The controller executes the pressure monitoring control logic 65 on a regular basis (e.g., every five seconds) in order to detect flow disturbances.

The corrective action taken in step 74 includes reducing the accept flow rate, increasing the reject flow rate, or completely shutting off the accept flow. The controller achieves these corrective actions by issuing signals on the lines 56, 62 to proportional control valves 58, 64, respectively. Each of these corrective actions is designed to reduce the amount of accumulated particles which are blocking flow through the screen basket 25. Advantageously, scheduling the screen differential pressure threshold value as a function of the accept flow rate reduces the number of unnecessary corrective actions which the system 10 initiates.

Figure 3:
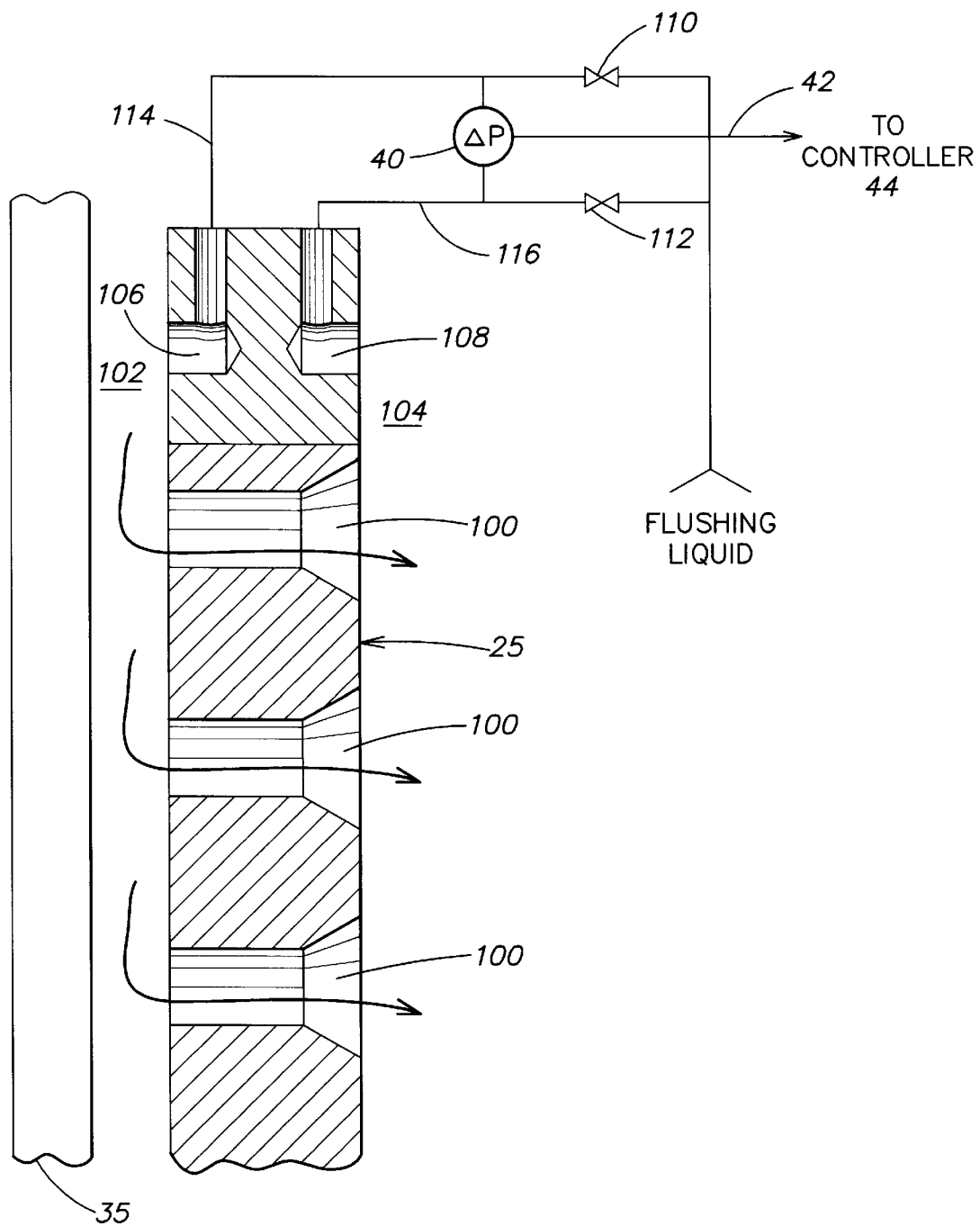
FIG. 3 illustrates a portion of a screen basket through which a portion of the liquid/solid suspension flows and a differential pressure sensor disposed to monitor the pressure across the screen basket.

FIG. 3 illustrates a cross sectional view of a portion of the cylindrical sidewall of the screen basket 25 and the foil 35. The screen basket includes a plurality of openings 100 sized to allow an accept portion of the liquid/solid suspension to pass from a first side 102 through the screen basket to a second side 104. The screen basket includes a first orifice 106 and a second orifice 108 (each about $\frac{1}{8}$" in diameter). The differential pressure sensor 40 senses the pressure across the pressure screen 25 via the first and second orifices 106, 108.

To prevent large particles from blocking the orifices 106, 108, the system includes valves 110, 112 which each provide a small flow of a flushing liquid (e.g., water) through flowing sense lines 114, 116. The valves 110, 112 provide the flow through the sense lines 114, 116 at a pressure sufficient to ensure that the flushing liquid exits the orifices 106, 108 at all nominal system operating conditions.

Figure 4:
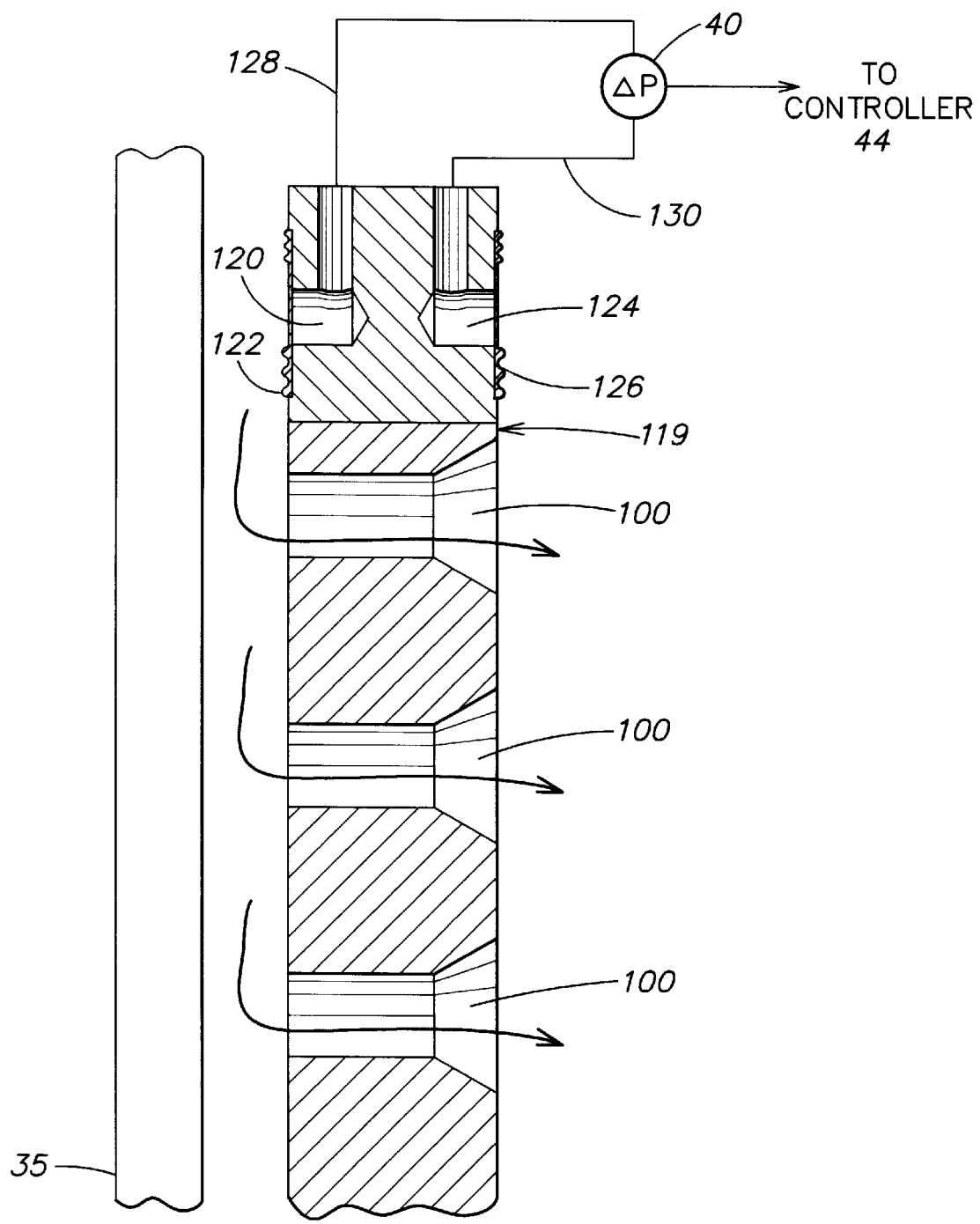
FIG. 4 illustrates a portion of the screen basket and an alternative embodiment for mounting the differential pressure transducer.

FIG. 4 illustrates a cross sectional view of a portion of the cylindrical side wall of a screen basket 119 having a first non-flowing orifice 120 covered by a flexible diaphragm 122, and a second non-flowing orifice 124 covered by flexible diaphragm 126. The orifices 120, 124 are located on opposite sides of the screen basket, and the differential pressure sensor 40 is connected to the orifices 120, 124 via nonflowing lines 128, 130.

In general, and as shown in FIGS. 3 and 4, it is preferred that the differential pressure is sensed directly across the screen basket. However, it is contemplated that the pressure may be monitored at different locations to detect pressure anomalies indicative of accumulated particles blocking flow through the screen basket. In addition, it is contemplated that the accept flow may be determined by using a separate accept flow rate sense line (not shown). This line would be relatively small with respect to the accept conduit and include a flow sensor. The flow in the main accept flow line (i.e., conduit 30) would then be easily computed since the flow in the main accept flow line would be proportional to the flow measured in the accept flow rate sense line.

In addition, while the controller 44 preferably includes a microprocessor, an alternative, less expensive controller may include dedicated electronic circuitry to perform the pressure monitoring control logic of the present invention. The present invention is also not limited to the use of differential pressure sensors. One of ordinary skill will recognize that absolute pressure sensors may be used.

Although the present invention has been shown and described with respect to several preferred embodiments thereof, various changes, omissions and additions to the form and detail thereof, may be made therein, without departing from the spirit and scope of the invention.

What is claimed is:

1. A pressure screening apparatus comprising:

a housing enclosing a chamber;

a screen basket contained in said chamber;

an inlet in said housing through which a liquid/solid suspension is admitted into said chamber for delivery to a first side of said screen basket, said screen basket having openings sized to allow an accept portion of said suspension to pass therethrough to a second side of said screen basket while retaining a reject portion of said suspension at said first side;

an accept outlet in said housing through which the accept portion of said suspension is removed from said chamber;

a reject outlet in said housing through which the reject portion of said suspension is removed from said housing;

first means for generating a first signal representative of any liquid pressure differential between the first and second sides of said screen basket;

second means for generating a second signal representative of the flow rate through said accept outlet; and means for comparing said first and second signals and for generating a third signal in the event that said pressure differential falls outside a range deemed to be appropriate for said flow rate.

2. The apparatus as claimed in claim 1 wherein said first means comprises first and second bores in said screen basket, said bores being isolated one from the other and opening respectively to the first and second sides of said screen basket, and a differential pressure transmitter connected across conduits communicating with said bores.

3. The apparatus as claimed in claim 2 wherein said bores are continuously flushed by liquid flowing through said conduits.

4. The apparatus as claimed in claim 2 wherein said bores are closed at the first and second sides of said screen basket by flexible diaphragms, and said conduits form a closed loop containing liquid.

5. The apparatus as claimed in claim 1 wherein said second means comprises a control orifice in a conduit communicating with said accept outlet, and a differential pressure transmitter connected to said conduit on opposite sides of said control orifice.

6. The apparatus as claimed in claim 1 wherein said second means comprises:

a conduit through which some but not all of said accept portion is caused to flow prior to being removed from said chamber via said accept outlet;

a control orifice in said conduit; and a differential pressure transmitter connected to said conduit on opposite sides of said control orifice.

7. For use with a pressure screening apparatus having a chamber containing a screen basket, an inlet through which a liquid/solid suspension is admitted into said chamber for delivery to a first side of said screen basket, said screen basket having openings sized to allow an accept portion of said suspension to flow therethrough to a second side of said screen basket while retaining larger reject particles at said first side, an accept outlet through which the accept portion of said suspension is removed from said chamber, and a reject outlet through which said reject particles are removed from said chamber, a system for monitoring the flow of said suspension through said chamber, said system comprising:

means for generating a first signal representative of any liquid pressure differential between the first and second sides of said screen basket;

means for generating a second signal representative of the flow rate through said accept outlet; and means responsive to said first and second signals, for generating a third signal in the event that said pressure differential exceeds that which is considered to be appropriate for said flow rate.

8. The system of claim 7, wherein said means for generating a third signal comprises a controller which includes a microprocessor that executes programmable software routines.

9. The system of claim 7, wherein said means for generating a third signal comprises:

means for generating a screen differential pressure threshold value as a function of said second signal; and a comparator which compares said screen differential pressure threshold signal to said first signal, and generates said third signal when said first signal exceeds said screen differential pressure threshold value.

10. The system of claim 7, wherein said means for generating a first signal comprises:

a differential pressure sensor;

a first orifice located on the first side of said screen basket and operatively connected to said differential pressure sensor; and a second orifice located on the second side of said screen basket and operatively connected to said differential pressure sensor.

11. The system of claim 10, wherein said first orifice is covered by a first flexible diaphragm and said second orifice is covered by a second flexible diaphragm.

12. The system of claim 10, wherein said first orifice is connected to a first flowing line which is operatively connected to said pressure sensor, and said second orifice is connected to a second flowing line operatively connected to said pressure sensor, wherein said first and second flowing lines carry a flushing liquid which exits said first and second orifices.

13. A method of monitoring the performance of a pressure screening apparatus, said apparatus having a housing enclosing a chamber, a screen basket contained in said chamber, an inlet in said housing through which a liquid/solid suspension is admitted into said chamber for delivery to a first side of said screen basket, with openings in said screen basket sized to allow an accept portion of said suspension to pass therethrough to a second side of said screen basket while retaining a reject portion of said suspension at said first side, an accept outlet in said housing through which the accept portion of said suspension is removed from said chamber; and a reject outlet in said housing through which the reject portion of said suspension is removed from said housing, said method comprising:

generating a first signal representative of any liquid pressure differential between the first and second sides of said screen basket;

generating a second signal representative of the flow rate through said accept outlet; and monitoring said first and second signals and generating a third signal in the event that the value of said first signal falls outside a range deemed to be appropriate for said flow rate.

14. The method of claim 13, wherein said step of monitoring includes the steps of:

generating a screen differential pressure threshold value as a function of said second signal; and comparing said first signal against said screen differential pressure threshold value and generating said third signal when said first signal exceeds said screen differential pressure threshold value.

15. The method of claim 14, wherein said steps of generating a first signal, generating a second signal and monitoring are performed regularly to monitor the performance of the pressure screening apparatus.

16. The method of claim 14, further comprising the step of:

initiating, in response to said third signal, corrective action to reduce the pressure across the screen basket.

17. The method of claim 16, wherein said step of initiating includes the step of reducing the accept flow rate.

18. The method of claim 16, wherein said step of initiating includes the step of increasing the reject flow rate.

* * * * *